United States Patent
Chen et al.

[11] Patent Number: 5,886,860
[45] Date of Patent: Mar. 23, 1999

[54] CIRCUIT BREAKERS WITH PTC (POSITIVE TEMPERATURE COEFFICIENT RESISTIVITY

[75] Inventors: William Weizhong Chen; Colin Cornhill; Andy Haun, all of Cedar Rapids; Gary Scott, Mt. Vernon; Manzoor Ali, Cedar Rapids; William Rezac, Cedar Rapids; Kevin James Green, Cedar Rapids, all of Iowa

[73] Assignee: Square D Company, Palatine, Ill.

[21] Appl. No.: 918,768

[22] Filed: Aug. 25, 1997

[51] Int. Cl.$^6$ ........................................ H02H 3/00
[52] U.S. Cl. .................. 361/9; 361/13; 361/45; 361/106; 361/165
[58] Field of Search ..................... 361/2–13, 93, 361/57, 102, 106, 14, 42–46, 54, 58, 161, 165, 166, 187; 218/1–8, 14, 16–17, 143, 154; 337/12, 14–15, 28; 338/20–21, 22 R, 23; 335/201, 35, 195; 219/110, 485, 491, 494–497, 510–511, 514, 519

[56] References Cited

U.S. PATENT DOCUMENTS

| | | | |
|---|---|---|---|
| 3,249,810 | 5/1966 | Strom et al. | 361/3 |
| 3,921,109 | 11/1975 | Hodgson | 335/195 |
| 3,949,332 | 4/1976 | Reuting | 335/81 |
| 4,004,201 | 1/1977 | DePuy | 361/96 |
| 4,070,641 | 1/1978 | Khalid | 338/61 |
| 4,080,640 | 3/1978 | Elms et al. | 361/45 |
| 4,562,323 | 12/1985 | Belbel et al. | 218/117 |
| 4,596,911 | 6/1986 | Guery et al. | 218/117 |
| 4,677,266 | 6/1987 | Belbel et al. | 218/117 |
| 4,736,265 | 4/1988 | Gyongyosi et al. | 361/45 |
| 4,801,772 | 1/1989 | Bratkowski et al. | 218/117 |
| 4,816,958 | 3/1989 | Belbel et al. | 361/93 |
| 4,937,696 | 6/1990 | Yoshino et al. | 361/11 |
| 4,999,732 | 3/1991 | Mihara | 361/150 |
| 5,128,826 | 7/1992 | Yoneshige | 361/165 |
| 5,185,685 | 2/1993 | Tennies et al. | 361/45 |
| 5,195,013 | 3/1993 | Jacobs et al. | 361/106 |
| 5,214,405 | 5/1993 | Glas | 337/71 |
| 5,254,816 | 10/1993 | Shutoh et al. | 218/143 |
| 5,296,996 | 3/1994 | Hansson et al. | 361/24 |
| 5,303,115 | 4/1994 | Nayar et al. | 361/106 |
| 5,345,126 | 9/1994 | Bunch | 310/68 C |
| 5,378,407 | 1/1995 | Chandler et al. | 252/513 |
| 5,382,938 | 1/1995 | Hansson et al. | 338/22 R |
| 5,414,403 | 5/1995 | Greuter et al. | 338/22 R |
| 5,424,504 | 6/1995 | Tanaka et al. | 218/78 |
| 5,428,195 | 6/1995 | Arnold | 218/1 |
| 5,428,493 | 6/1995 | Takeuchi et al. | 361/27 |
| 5,436,609 | 7/1995 | Chan et al. | 338/22 R |
| 5,473,495 | 12/1995 | Bauer | 361/11 |
| 5,495,083 | 2/1996 | Aymami-Pala et al. | 218/1 |
| 5,530,613 | 6/1996 | Bauer et al. | 361/58 |
| 5,539,370 | 7/1996 | Arnold | 337/8 |
| 5,550,707 | 8/1996 | Iversen | 361/617 |
| 5,629,658 | 5/1997 | Chen | 335/201 |
| 5,666,254 | 9/1997 | Thomas et al. | 361/8 |
| 5,672,918 | 9/1997 | Kimbrough et al. | 307/126 |
| 5,689,395 | 11/1997 | Duffy et al. | 361/93 |
| 5,715,130 | 2/1998 | Ikeda | 361/149 |

FOREIGN PATENT DOCUMENTS

WO91/12643  8/1991  WIPO.

OTHER PUBLICATIONS

"Components, Hybrids, and Manufacturing Technology" IEEE, v. CHMT–5 pp. 225–230 (Jun. 1982).

Primary Examiner—Jeffrey Gaffin
Assistant Examiner—Michael J. Sherry
Attorney, Agent, or Firm—Larry I. Golden; Kareem M. Irfan

[57] ABSTRACT

A Positive Temperature Coefficient Resistivity (PTC) element has a resistivity that increases as the temperature increases. Circuit breakers having PTC elements can achieve better overload and short circuit protection than existing products. Breakers with PTC elements can also be combined with ground fault detection circuits to activate the circuit breaker under ground fault conditions that are less severe than the overcurrent conditions that would normally activate the circuit breaker. A shunt trip assembly incorporating a PTC resistor reduces the required power rating of the clearing switch.

8 Claims, 10 Drawing Sheets

CIRCUIT BREAKERS WITH PTC (POSITIVE TEMPERATURE COEFFICIENT RESISTIVITY

FIELD OF THE INVENTION

The invention relates to the use of elements with Positive Temperature Coefficient Resistivity (PTC) in circuit breakers.

BACKGROUND OF THE INVENTION

Circuit breakers are widely used in residential and industrial applications for the interruption of electrical current in power lines upon conditions of severe overcurrent caused by short circuits or by ground faults. One of the problems associated with the process of interruption of the current during severe overcurrent conditions is arcing. Arcing occurs between the contacts of circuit breakers used to interrupt the current, which is highly undesirable for several reasons. Arcing causes deterioration of the contacts of the breaker and it causes gas pressure to build up. It also necessitates circuit breakers with larger separation between the contacts in the open position to ensure that the arc does not persist with the contacts in the fully open position.

Prior art devices have used a number of approaches to limit the occurrence of arcing. In heavy duty switchgear, the contacts may be enclosed in a vacuum or in an atmosphere of $SF_6$. Both of these approaches are expensive. Besides, $SF_6$ has been identified as a greenhouse gas.

Another approach that has been used to limit the amount of arcing is the use of a resistor connected in parallel with the main contacts of the circuit breaker. Upon opening of the main contacts, current can still flow through the shunt resistor, effectively reducing the amount of arcing in the main contacts. The current flowing through the resistor is less than the short circuit current that would flow through the main contacts in the absence of the resistor, and the opening of a second pair of contacts connected in series with the resistor can be accomplished with less arcing than would occur in the absence of the shunt resistor.

Tanaka et al., (U.S. Pat. No. 5,424,504) teach a circuit breaker in which a resistor-provided UHV breaker has a tank sealing an insulating gas, a main contact and a resistor unit connected in parallel to the main contacts also located in the tank. Mechanisms are provided so that the resistor contact is made before and broken after the main contact is made and broken. The resistor has to be rated to withstand the high currents and temperatures during short circuit conditions.

Khalid U.S. Pat. No. 4,070,641 teaches a current limiting circuit breaker in which the current limiting contacts are in series with the main contacts of a breaker. Opening of the limiting contacts shunts high fault current through the resistor. The resistor is an iron wire resistor with a positive temperature coefficient (PTC) of resistance. The flow of the short circuit current through the resistor heats the resistor, thereby increasing its resistance and limiting the buildup of the short circuit current.

Perkins et al. ("IEEE Transactions on Components, Hybrids, and Manufacturing Technology", v.CHMT-5, *A New PTC Resistor For Power Applications*, pgs 225–230 (June 1982) describe a PTC resistor that utilizes the metal-insulator solid state transition in $(V,Cr)_2O_3$. At a transition temperature of 80° C., the resistivity of a ceramic body including $(V,Cr)_2O_3$ increases to a value 100 times the value at 20° C. They disclose the use of a PTC element for overcurrent protection as a substitute for a bimetallic strip for overcurrent protection. The switch is connected to a PTC element that is shunted by the actuating coil for the switch. During normal operating conditions, the current flows through the PTC resistor. During short circuit conditions, the rapid heating of the PTC resistor leads to an increased resistance and voltage across the PTC resistor, diverting current through the actuating coil which then trips the switch.

Hansson et al. (U.S. Pat. No. 5,382,938) disclose a PTC element that is capable of withstanding short circuit currents without damage, thereby enabling it to be reused. FIG. 1 shows a disclosure by Hansson '938 on the use of a PTC element 22 as an overcurrent protection device for a motor 25. The PTC element is connected in series with a switch 23 and in parallel with an excitation coil 24 that operates the switch 23. An overcurrent in the circuit heats the PTC element 22 and at a certain temperature, its resistance rises sharply. The voltage across the PTC element 22 is then sufficient to cause the excitation coil 24 to trip the switch 23. Hansson et al (WO 91/12643) discloses a more complicated invention for motor and short circuit protection using a PTC element. A switch is connected in series with a tripping circuit consisting of two parallel connected current branches. One of these branches has the excitation coil for the switch while the other branch has two PTC resistors. Overcurrent conditions cause a buildup of voltage across the PTC resistors that then activates the excitation coil for the switch.

Chen (U.S. Pat. No. 5,629,658) discloses a number of devices in which PTC elements are used in conjunction with two or more switches to limit the current under short circuit conditions and thereby reduce the associated arcing.

One problem with PTC resistors is their durability: they have to be designed to withstand the heating that accompanies short circuit currents. This can make their use more expensive unless arrangements are made to limit this heating.

Yet another approach used to reduce arcing in switchgear involves the use of mechanical means to break the arc. Belbel et al. (U.S. Pat. No. 4,562,323) discloses a switch in which an electrically insulating screen is inserted between the contacts during the opening of the contacts. The control of the movement of the screen is obtained by propulsion means separate from those causing the separation of the contacts. Belbel et al. (U.S. Pat. No. 4,677,266) disclose another switch that has an insulating screen that adapts the breaking speed as the current increases. Bratkowski et al. (U.S. Pat. No. 4,801,772) disclose a current limiting circuit interrupted in which an insulating wedge is inserted between the contact arms as they open.

Most of the prior art methods discussed above are addressed towards industrial applications. For residential use, even though the voltage and the loads are smaller, commercially available circuit breakers still have a significant amount of arcing accompanying their operation. The present invention achieves interruption of electrical currents with a reduction in arcing, noise and gas venting. The present invention also reduces the cost and enclosure requirements for residential circuit breakers and increases the switching capacity of a normal relay.

Additionally, the invention improves the operation of circuit breakers when a ground fault is detected without a mechanical linkage between the ground fault circuit and the circuit breaker. For heavy duty and high voltage devices, the invention replaces $SF_6$ and vacuum switchgear by air circuit breakers while accomplishing many of the objectives listed above.

SUMMARY OF THE INVENTION

One aspect of the invention uses a PTC element in a circuit breaker in series with a power line. The voltage increase across the PTC element during an overload is used to drive a relay coil for opening the main contacts. In order to prevent heat damage to the PTC elements during a short circuit, one or more metal oxide varistors are in parallel with the PTC component. This limits the maximum voltage (and hence the amount of heating) that occurs in the PTC element. Another aspect of the invention is the ability of a circuit breaker incorporating a PTC element to respond to ground faults. A ground fault interrupter circuit is used to energize a trip coil wound on the same core as the relay coil. In another embodiment, the trip coil is eliminated and the fall line voltage is applied to the relay coil.

Another embodiment of the invention uses a switching device that is triggered by a ground fault sensing circuit to short the line; the resulting short circuit current operates the circuit breaker having a PTC element.

Another aspect of the invention is the use of PTC elements in a current limiting circuit breaker. The current limiting breaker could be used in low, medium and high voltage switching devices. Two pairs of contacts are provided in series with the line and in parallel with each other. The main contacts are provided with an insulating wedge that breaks the arc. The insulating wedge is driven by the magnetic forces caused by the short circuit line current. Upon opening of the main contacts, the current flows through the secondary contacts that are provided with a PTC element; the presence of the secondary contacts limits the arcing in the main contacts while the PTC element limits the current that has to be interrupted by the secondary contacts. In an alternate embodiment, the secondary contacts are eliminated and the invention is used as an accessory module in conjunction with another circuit breaker.

Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE FIGURES

For detailed understanding of the present invention, reference should be made to the following detailed description of the preferred embodiment, taken in conjunction with the accompanying drawings, in which like elements have been given like numerals, and wherein.

DETAILED DESCRIPTION OF THE INVENTION

Figure 1:
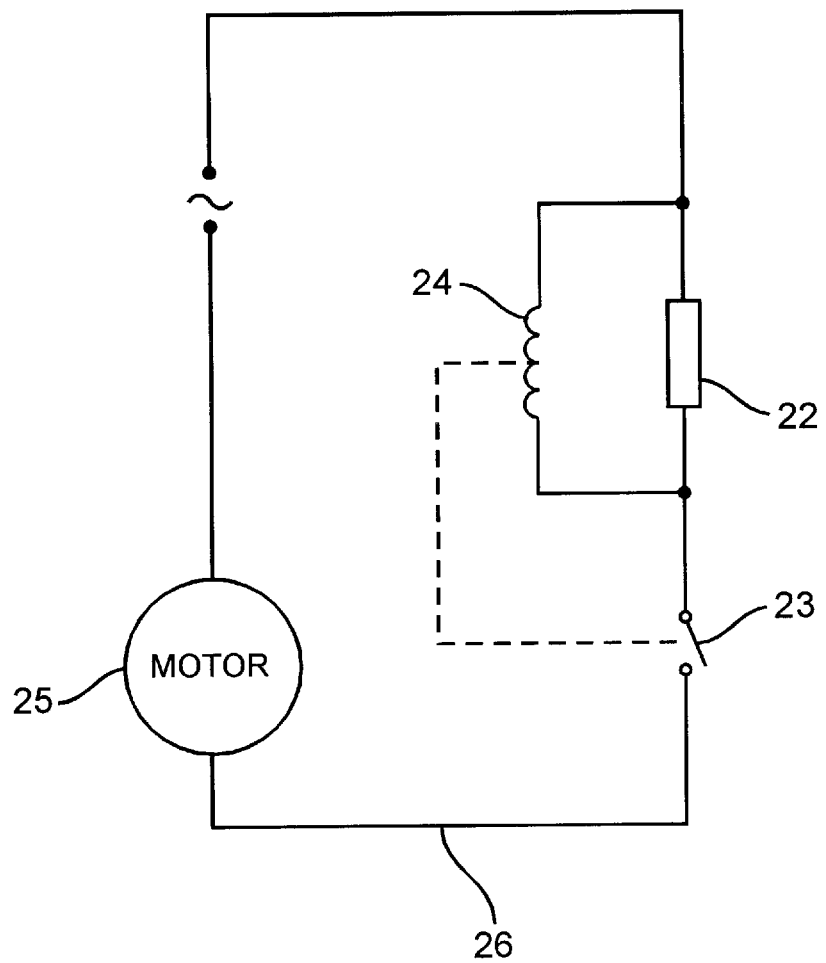
FIG. 1 (prior art) shows the use of a PTC element as an overcurrent protection device for a motor.

FIG. 1 shows a prior art device that uses a PTC element 22 as an overcurrent protection device for a motor 25. The PTC element is connected in series with a switch 23 and in parallel with an excitation coil 24 that operates the switch 23. An overcurrent in the circuit heats the PTC element 22 and at a certain temperature, its resistance rises sharply. The voltage across the PTC element 22 is then sufficient to cause the excitation coil 24 to trip the switch 23.

Figure 2:
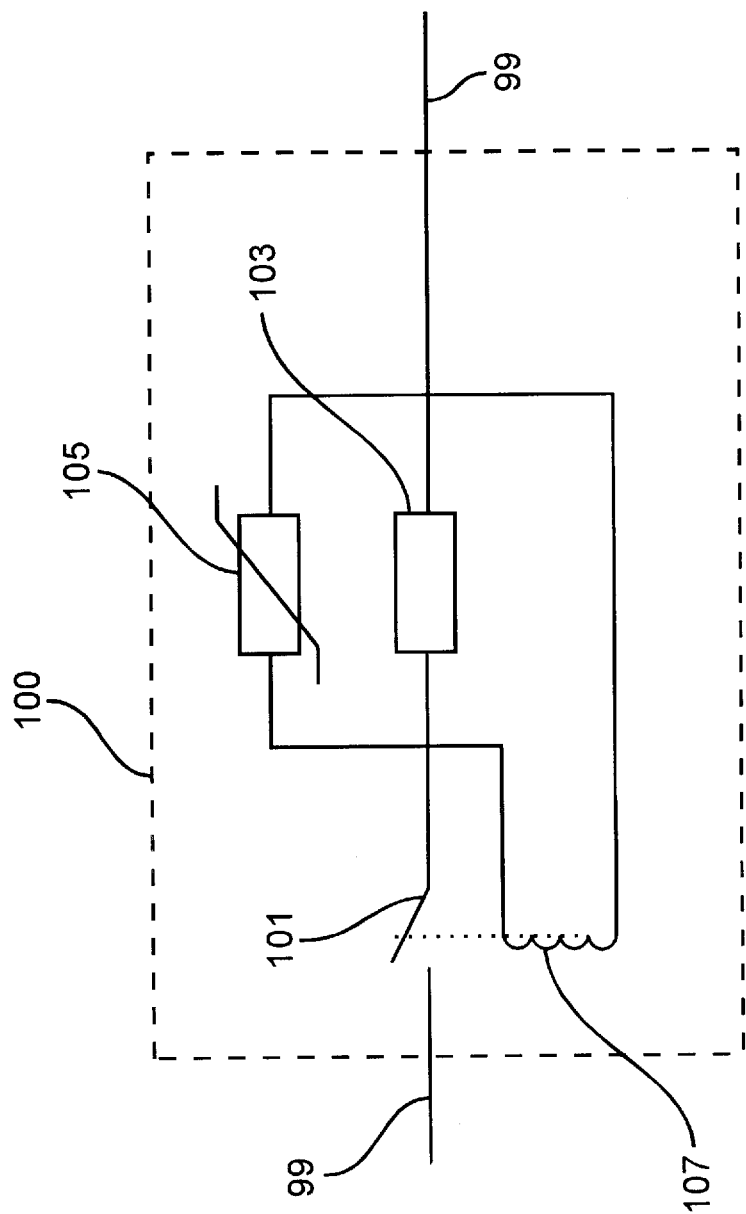
FIG. 2 shows the use of a PTC element in accordance with an embodiment of this invention.

One drawback of the prior art device of FIG. 1 is that there is nothing to limit the voltage across PTC element. This problem is overcome in one embodiment of the present invention shown in FIG. 2. The circuit breaker 100 is connected in series to the line 99. Internal to the circuit breaker are the contacts 101. In series with the contacts are the PTC element 103 shunted by one or more varistors. The PTC components could be made from conductive polymers, ceramic $BaTiO_3$, or any other PTC material having a resistivity greater than 0.1 Ωcm. at room temperature. In order to limit the complexity of the figure, only one varistor, 105, is shown. The purpose of the varistor 105 is to protect the PTC component. The rated voltage of the varistor has to be equal to or smaller than the rated voltage of the PTC component. In other words, the clamping voltage of the varistor has to be equal to or smaller than the transient failure voltage of the PTC component. The pair of separable contacts, 101, in line with the PTC components are driven to open by a coil connected in parallel with the PTC component. A mechanism similar to the magnetic latching relay shown in FIG. 3 could be used for the purpose.

Figure 3:
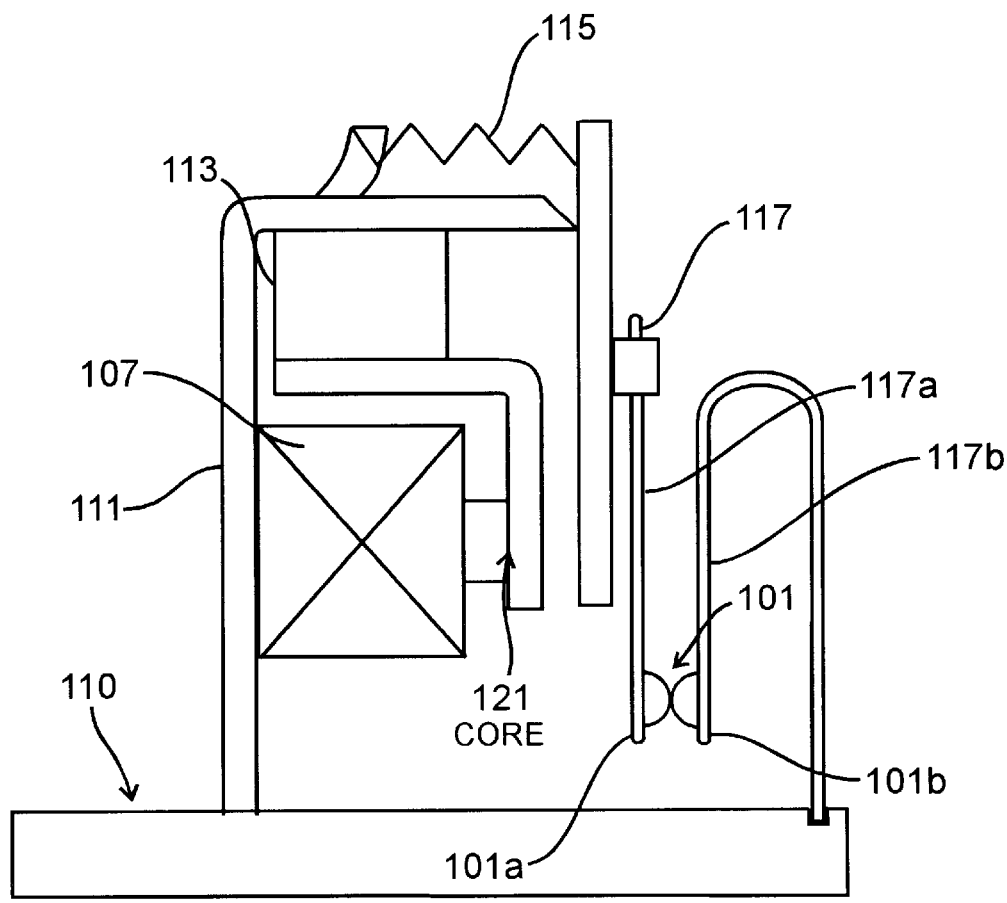
FIG. 3 shows a magnetic relay that can be used to operate the invention of FIG. 2.

The magnetic latching device of FIG. 3 comprises, a stiff copper blade 117 attached to a base 110 by means of suitable support, 111. The free end of the copper blade 117, carries the movable contact 101a. A permanent magnet, 113, and tension spring, 115, keep the contacts closed under normal conditions. The coil 107 is wound on a core 121. Under short circuit conditions, the coil 107 is energized and the magnetic field produced therein moves the contact 101a away from the fixed contact 101b, thus breaking the circuit. A novel feature of the device in FIG. 3 is shown by the body 117a of the stiff copper blade forming the moveable contact 101a and the body 117b forming the fixed contact 101b: these form a reverse current loop such that during short circuit conditions, there is a repulsive force between portions 117a and 117b that forces the contact 101a away from the fixed contact 101b. Once the contacts have opened, the permanent magnet 113 serves to keep contacts latched in the open position.

Figure 4:
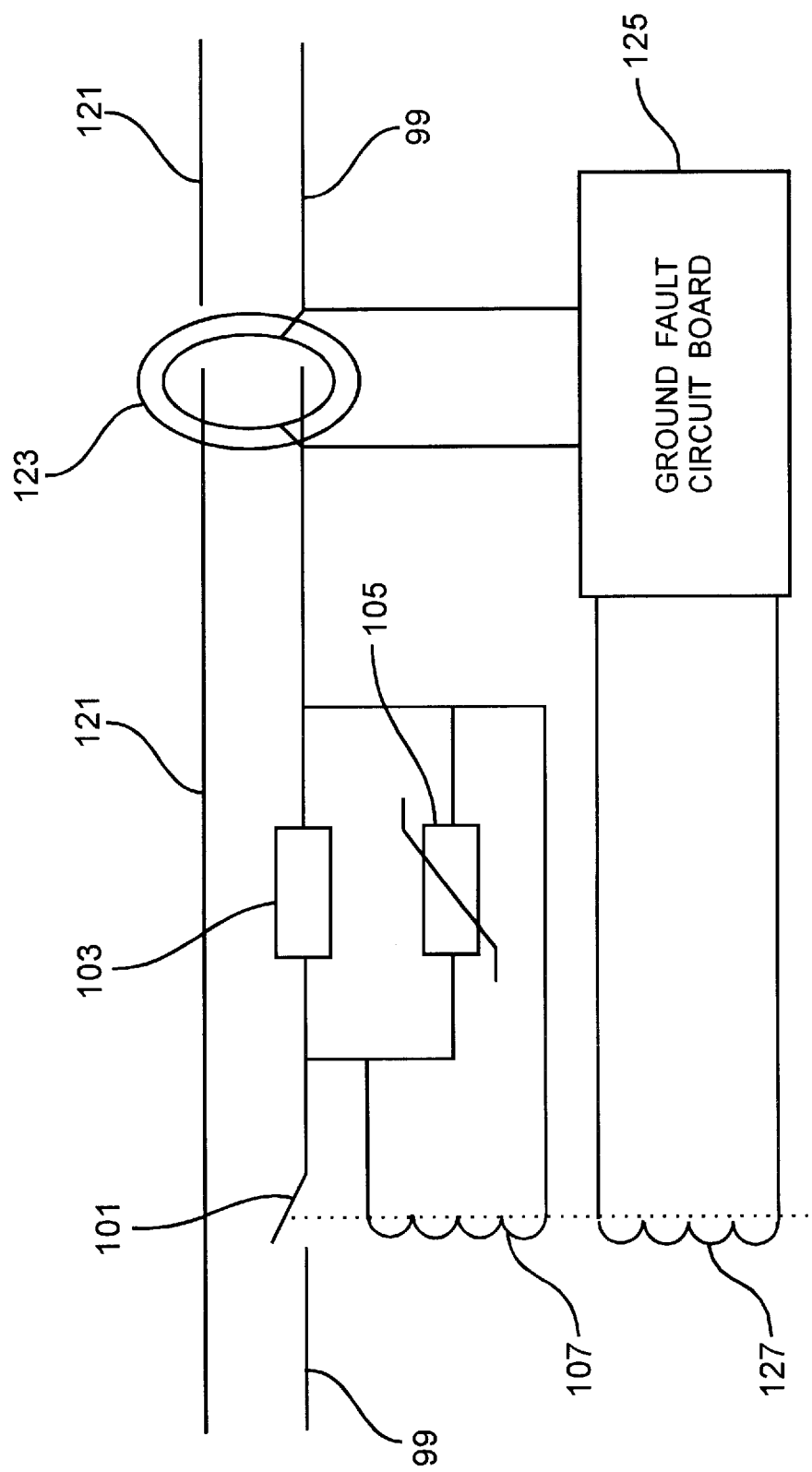
FIG. 4 shows one way in which the invention of FIG. 2 can be adapted to respond to ground faults.

Another embodiment of the invention, illustrated in FIG. 4, shows how a circuit breaker of the present invention can interrupt the flow of current when a ground fault occurs. As would be known to those versed in the art, a ground fault interruption circuit is designed to interrupt the electric current to the load when a fault current to ground exceeds some predetermined value that is less than that required to operate the overcurrent protective device of the supply circuit. As in FIG. 2, the contacts 101 are in series with the live line, 99. The neutral line 121 is also indicated in FIG. 4. A ground fault detection circuit, 123, is on the load side of the circuit breaker. The ground fault detection circuit, 123, sends a signal to a ground fault circuit board, 125, upon occurrence of a ground fault. The ground fault circuit board activates a trip coil, 127, that is also capable of operating the contacts 101. The trip coil 127 and the relay coil 107 could be wound on the same core. The relay coil will be energized to trip the breaker whenever there is an overload or short circuit. The trip coil will be energized to trip the circuit breaker whenever there is a ground fault in the circuit.

Figure 5:
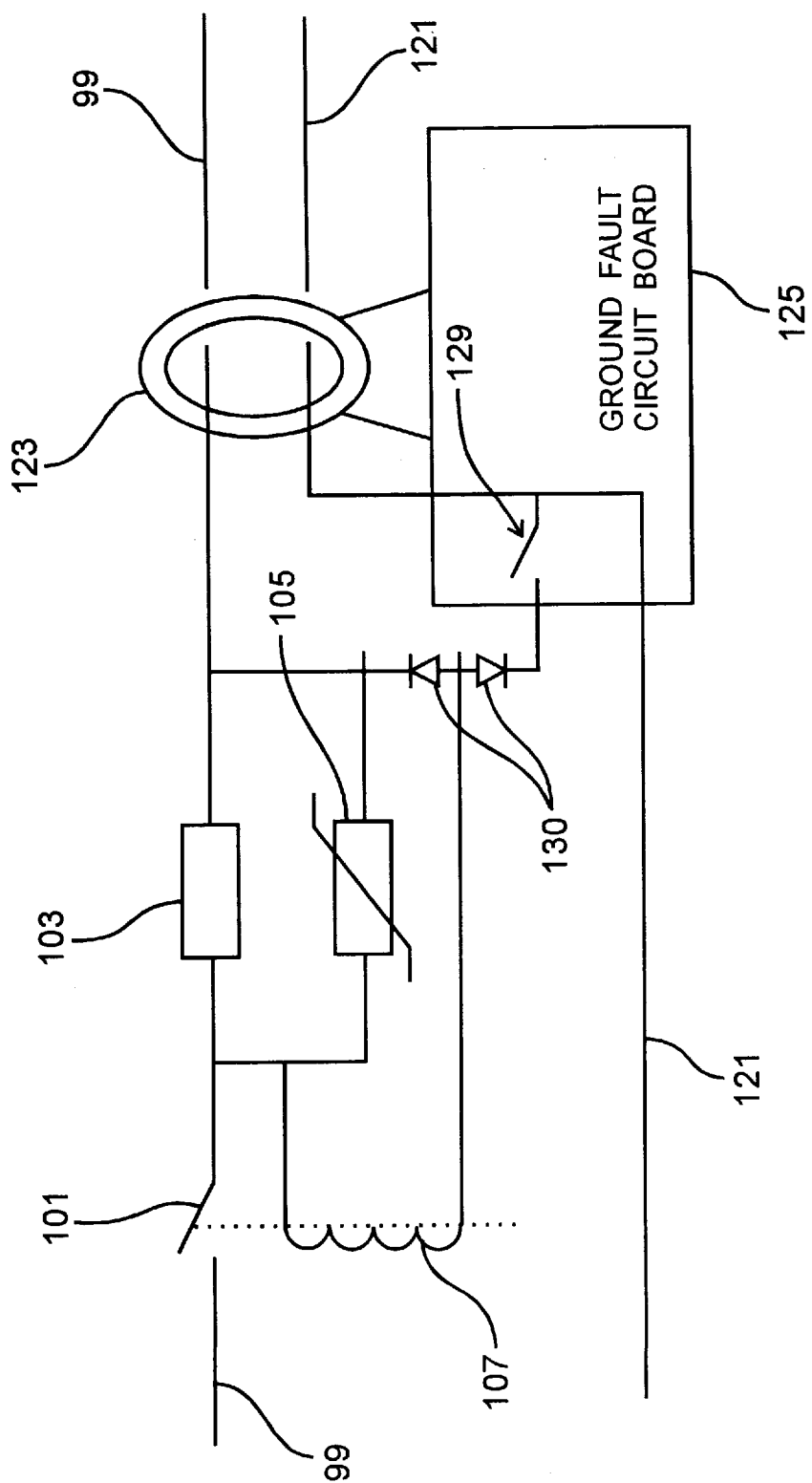
FIG. 5 shows a second manner in which the invention of FIG. 2 can be used to respond to ground faults.

An alternate embodiment of the circuit breaker of the present invention eliminates the use of a second coil for ground fault interruption. It is illustrated in FIG. 5. As in the embodiment of FIG. 4, the contacts are on the live line 99. The ground fault detection circuit, 123, sends a signal to the ground fault circuit board, 125, upon detection of a ground fault. The ground fault circuit board includes a semiconductor-controlled rectifier ("SCR") 129, that conducts upon detection of a ground fault. The effect of this is to apply the full line voltage across the relay coil, 107, thus activating it; the PTC element 103 and the varistor 105 are bypassed. The diodes 130 ensure that there will be no short circuit current flowing through the PTC element 103 in the event of a ground fault. The embodiment of the invention shown in FIG. 5 is mechanically simpler than the one of FIG. 4 in that there is only one coil to operate the switching.

Figure 6:
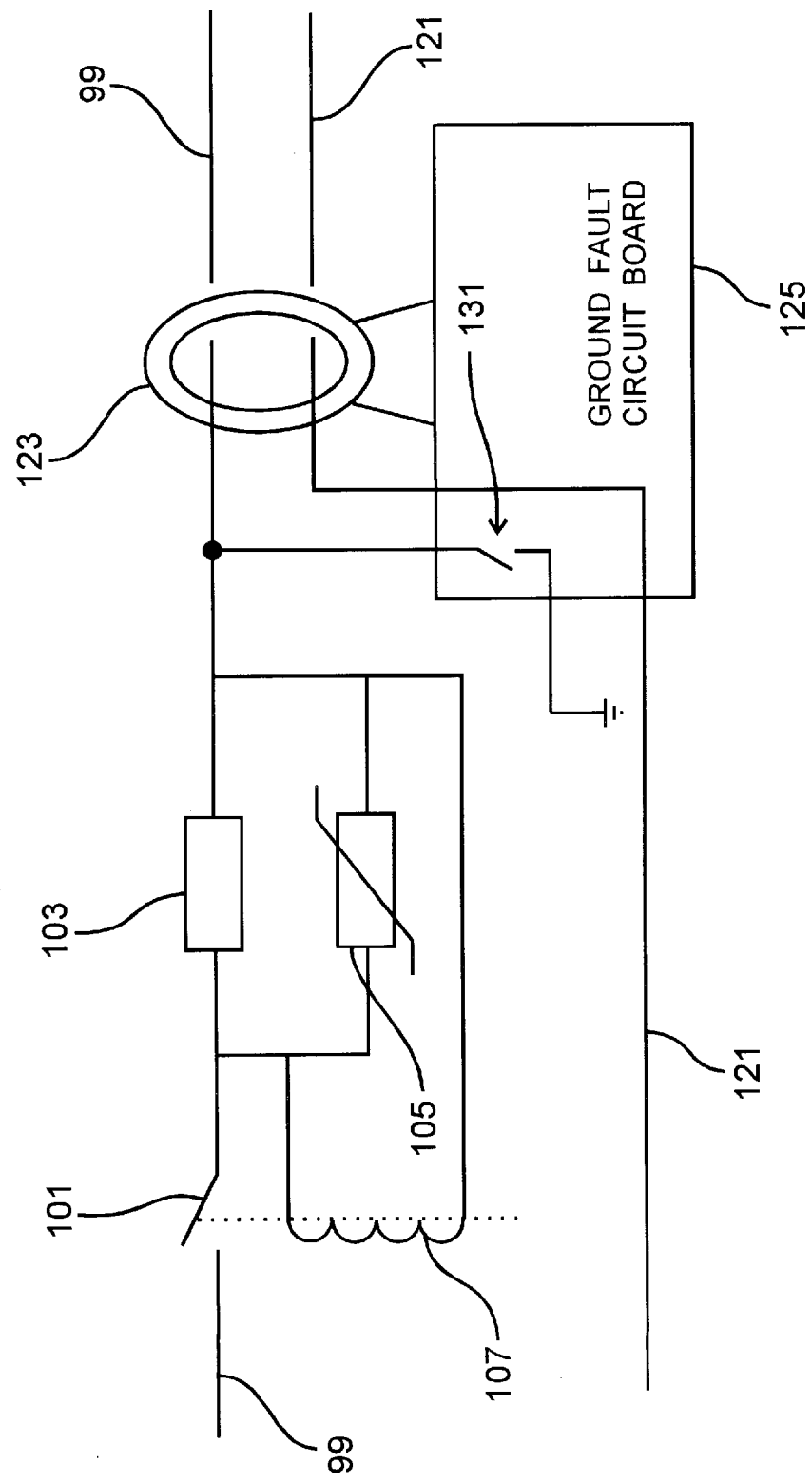
FIG. 6 illustrates the use of a PTC breaker in association with a shorting switch to respond to ground fault currents.

An alternate embodiment of the invention, illustrated in FIG. 6, eliminates the diodes 127 in FIG. 5. The switch, 131, shorts the line to ground, causing a large short circuit current to flow through the line. The breaker then operates as a short circuit protection device: the current causes heating of the PTC element, 103, leading to a buildup of voltage across the coil 107, causing the contacts to operate. The switch 131 could be an SCR as in FIG. 5. An advantage of this system is that no linkage is required between the ground fault detection circuit and the circuit breaker. This allows the manufacture of "standard circuit breakers" using high volume, cost effective manufacturing, without the loss of offering a Ground Fault Interruption (GFI) product; the GFI product could be sold as an accessory that could be either factory or field installed.

The embodiments discussed above are particularly suitable for use in residential applications with small ampere ratings. However, for industrial circuit breakers with large ampere ratings, embodiments of the invention discussed below are particularly useful.

Figure 7:
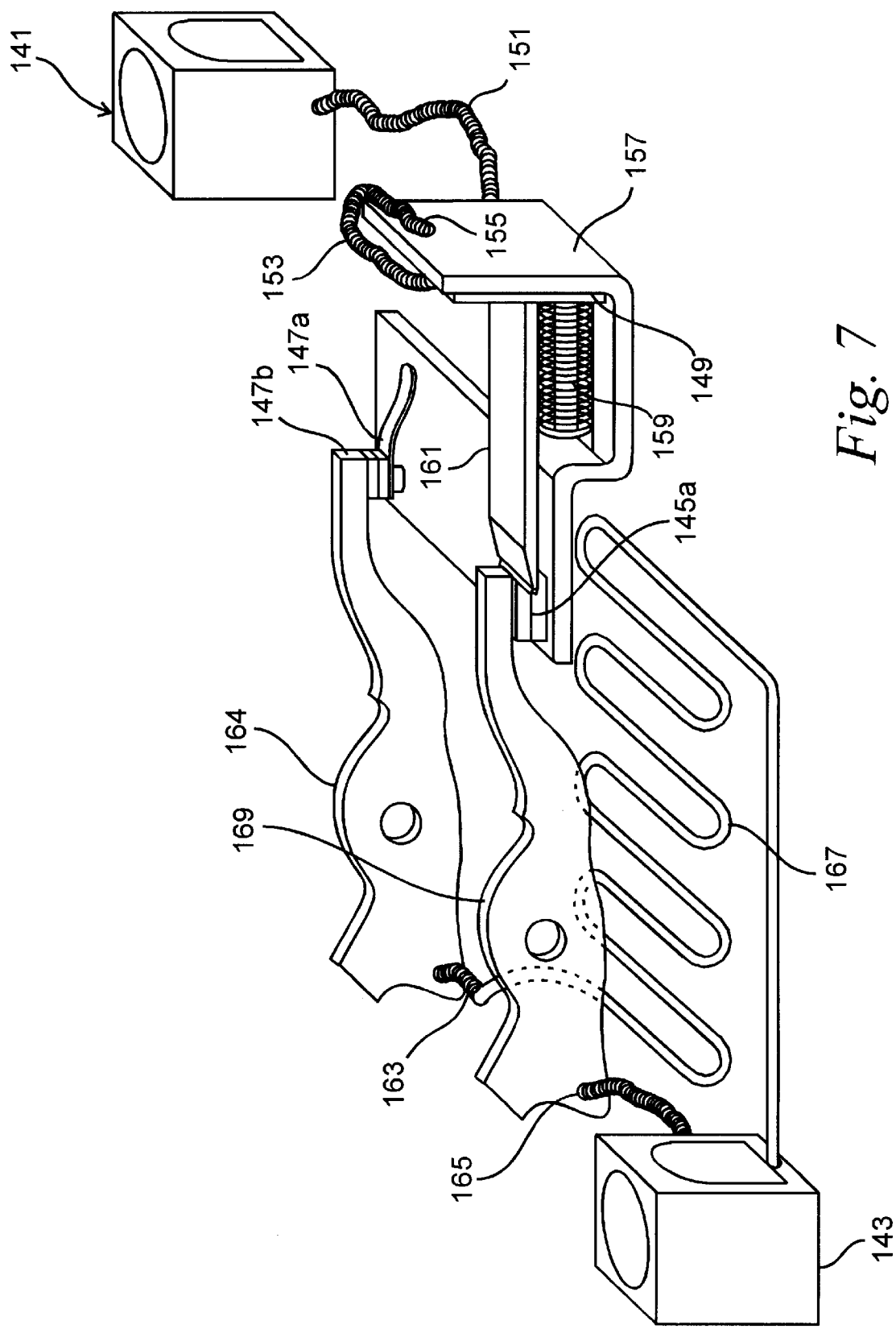
FIGS. 7 and 8 illustrate a current limiting PTC circuit breaker provided with a wedge mechanism for breaking the arc.

FIG. 7 shows a schematic diagram of a type of circuit breaker that is a current limiter. The breaker is provided with a pair of main contacts, 145a and 145b, and a pair of secondary contacts, 147a and 147b. The line terminal, 141, is connected by a first flexible connecter ("pig tail") to a movable magnetic plate, 149. The magnetic plate, 149, is connected by means of a second pig tail, 153, to a fixed magnetic plate, 157. The fixed magnetic plate, 157, is connected to one of the main contacts, 145a, and one of the secondary contacts, 147a. Contacts 145a and 147a are the fixed contacts. The movable main contact 145b is connected through the main blade, 169 and pig tail 165, to the load terminal 143. The movable secondary contact, 147b, is connected through the secondary blade, 164 to a PTC element 167. In the preferred embodiment, the PTC element 167 is made of tungsten. The preferred shape of the PTC element is the serpentine shape shown in the figures: this reduces the inductance of the PTC element. The PTC element 167 is, in turn connected to the load terminal 143.

The movable magnetic plate 149 is provided with a spring 159 to control its operation and is mechanically coupled to an insulating wedge 161, disposed so as to be capable of insertion between the main contacts 145a and 145b. The wedge is preferably made of glass filled nylon. In the preferred embodiment, a conventional mechanism, not shown, can move blades 164 and 169 and open the main contacts 145a and 145b and the secondary contacts 147a and 147b. Other mechanisms could also be used and are considered to be within the scope of the invention. For keeping the figures simple, these mechanisms are not shown.

The operation of the circuit breaker is best understood by considering what happens when a short circuit occurs. The fixed magnetic plate 157 and the movable magnetic plate 149 form a reverse current loop, carrying current in opposite directions. During short circuit conditions, this produces a strong repulsive force on the movable magnetic plate, 149, causing it to move the insulating wedge 161 between the main contacts 145a and 145b. The wedge, 161, extinguishes the arc between the main contacts. The reverse current loop should preferably be designed to provide a driving force that can accelerate the wedge at at least 5000 m/$^2$. The wedge, being quickly driven between the main contacts 145a and 145b, causes the arc to be extinguished in less than two milliseconds. The current then flows through the secondary contacts, 147a and 147b, and the PTC element 167. It is preferable that the voltage drop across the PTC element be less than 15 volts at the moment of opening of the main contacts 145a and 145b.

The resistance of the PTC element 167 is increased to at least 10 times its room temperature value as the PTC element is heated by the current. The PTC element is specially designed to withstand the heating. The secondary contacts then open to interrupt the circuit.

Under normal operations, most of the current goes through the main contacts. The magnetic force produced by the current in the reverse loop is not large enough to drive the wedge and the contact force between the main contacts is not affected by the wedge. Since the cold resistance of the tungsten wire used as a PTC element is at least ten times greater than the main contact resistance, little current is shunted through the tungsten wire, keeping its temperature low.

Figure 8:
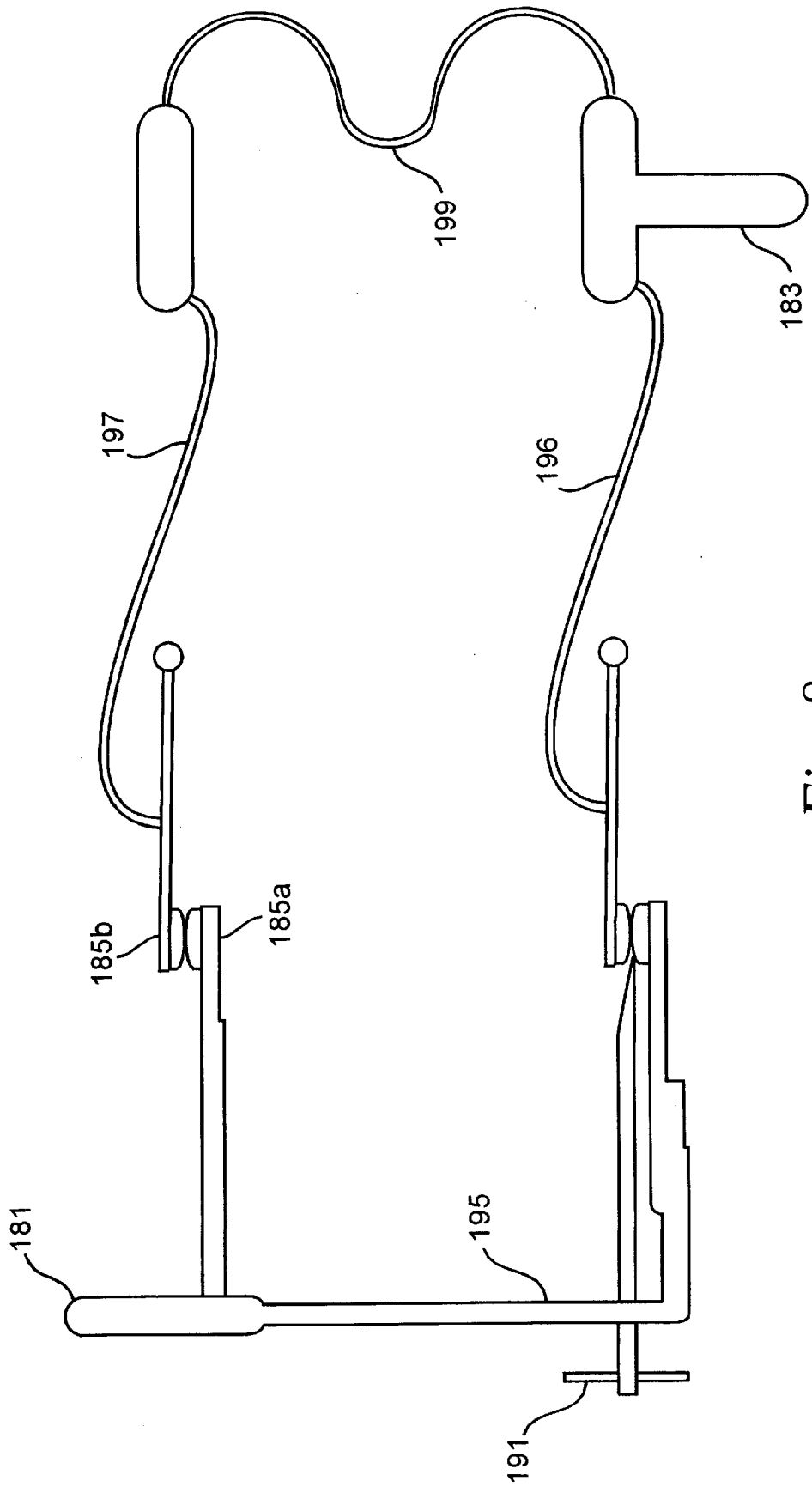

An alternate arrangement, shown in FIG. 8, eliminates the reverse current loop. The line terminal 181 is connected to the stationary main contact 187a and the stationary secondary contact 185a. The movable main contact 187b is connected to the load terminal 183 by means of a flexible connector 196 while the movable secondary contact 185b is connected to the PTC element 199 by a flexible connector 197. The PTC element 199 is, in turn, connected to the load terminal 183.

The wedge 193, adapted to be driven between the main contacts, is mechanically attached to the movable magnetic plate 191. The movable magnetic plate 191 is simply placed close to a current carrying bus 195. A short circuit current flowing through the bus is sufficient to cause motion of the magnetic plate 191 which, in turn, causes the wedge 193 to extinguish the arc between the main contacts 187a and 187b.

As noted above, the mechanism for causing the movement of the main and secondary breaker contacts is not discussed here. A variety of methods could be used. The sequence of operations is important. Proper operation of the invention requires that the secondary contacts open after the wedge has opened the main contacts during a short circuit interruption.

A portion of the device of FIGS. 7 or 8 could be used as a current limiting module. This is illustrated in FIG. 9, where such a module, designed to be used in series with another circuit breaker, is shown.

The module is provided with a pair of main contacts, 215a and 215b. The line terminal, 201, is connected by a first pig tail to a movable magnetic plate, 203. The magnetic plate, 203, is connected by means of a second pig tail, 207, to a fixed magnetic plate, 209. The fixed magnetic plate, 209, is connected to the fixed contact 215a, and the PTC element 219. The movable contact 215b is connected through the blade, 217 and pig tail 221, to the load terminal 223. In the preferred embodiment, the PTC element 219 is made of tungsten. The preferred shape of the PTC element is the serpentine shape shown in the figures: this reduces the inductance of the PTC element. The PTC element 219 is, in turn connected to the load terminal 223.

The movable magnetic plate 203 is provided with a spring 211 to control its operation and is mechanically coupled to an insulating wedge 213, disposed so as to be capable of insertion between the contacts 215a and 215b. The wedge is preferably made of glass filled nylon. In the preferred embodiment, insertion of the wedge also causes a mechanism, not shown, to move blade 217 and open the contacts 215a and 215b. It is also possible to have a mechanism, independent of the wedge, for sensing overcurrents and causing the opening of the movable contacts; this would lead to a more expensive device. Other mechanisms could also be used and are considered to be within the scope of the invention. For simplifying the figure, these mechanisms are not shown.

Figure 9:
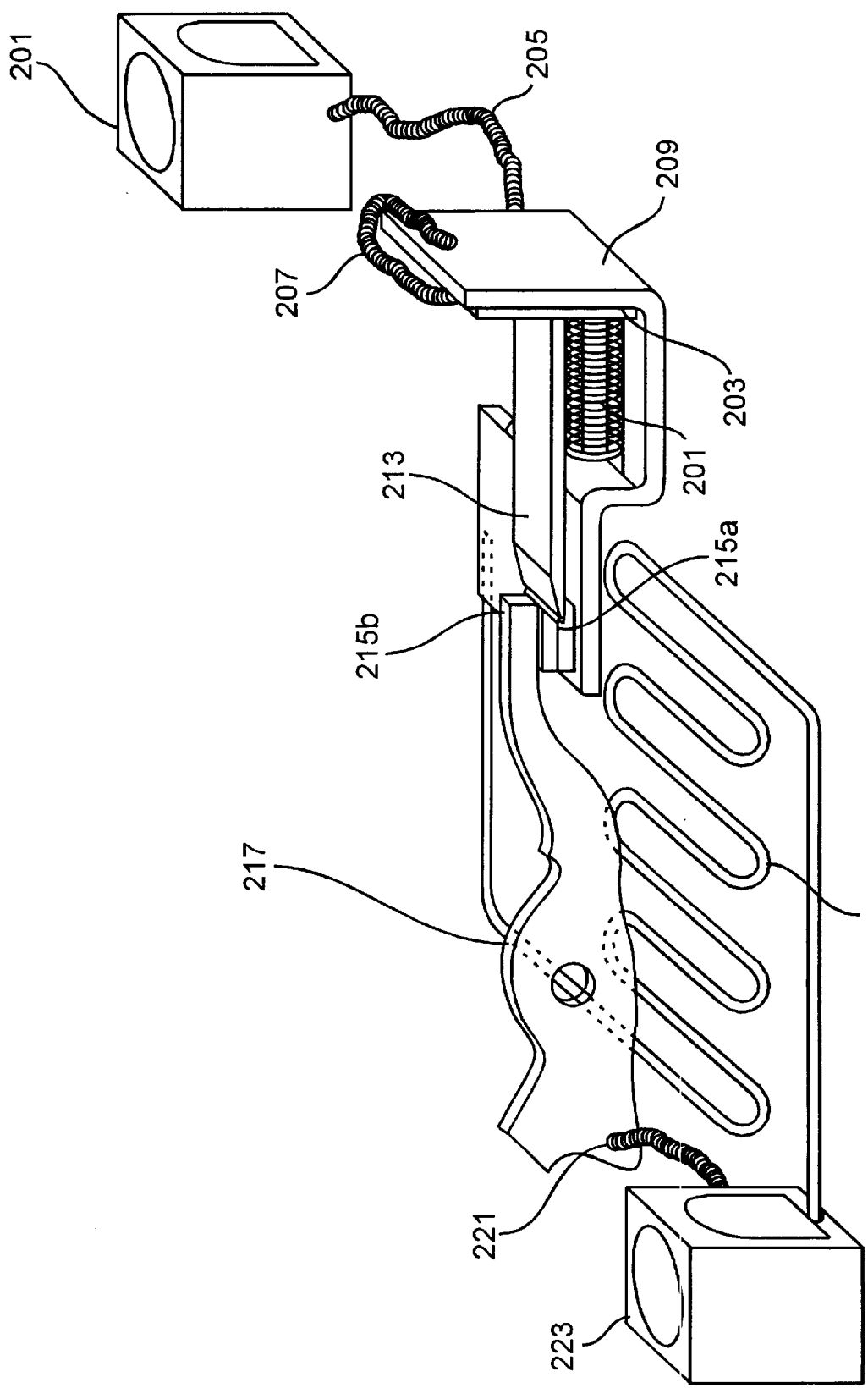
FIG. 9 illustrates a current limiting PTC module provided with a wedge mechanism for breaking the arc.

The main difference between the operation of the module shown in FIG. 9 and of the circuit breaker of FIG. 8 is the absence of the secondary contacts in the former. The device of FIG. 9 acts as a current limiter and complete interruption is performed by a breaker for which the device of FIG. 9 is an accessory.

The fundamental concept of the devices of FIGS. 7–9 is to convert most of the interruption energy into heating the PTC element, instead of generating an arc and gas pressure during a short circuit interruption, as happens in conventional prior art devices. In existing medium and high voltage circuit breakers, $SF_6$ or a vacuum has to be used to suppress the arcing. In the present invention, the arcing is greatly reduced, so that $SF_6$ or a vacuum are no longer necessary. This makes it possible to build air circuit breakers to perform the same function. This reduces the cost considerably.

Figure 10:
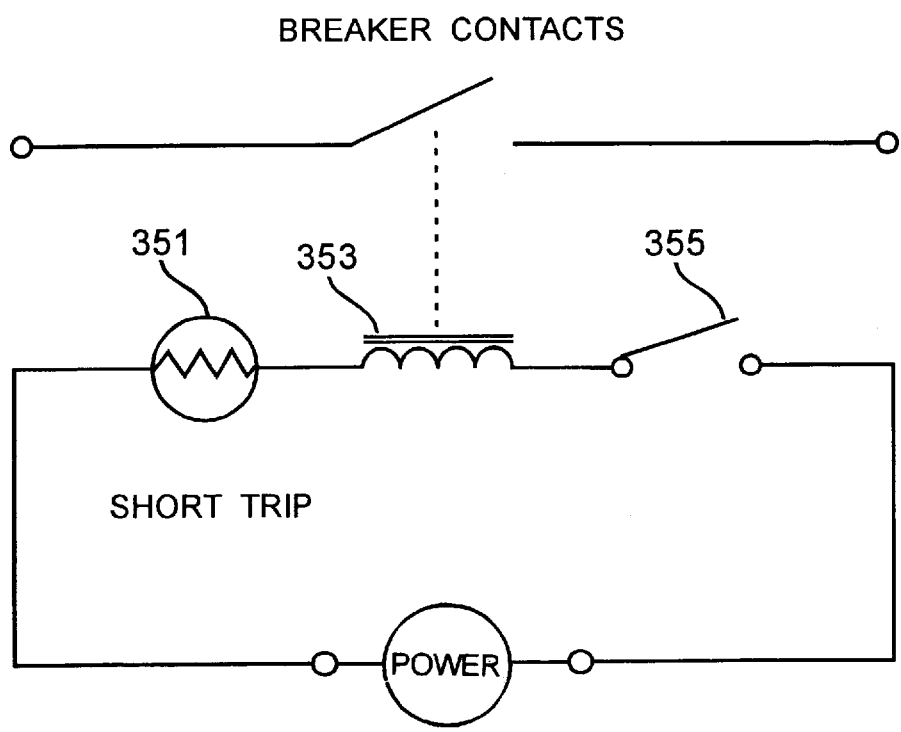
FIG. 10 shows the use of a PTC element in accordance with an embodiment of this invention.

FIG. 10 illustrates another embodiment of the invention. Shown is a shunt trip assembly incorporating a PTC resistor. The shunt trip is used to trip a circuit breaker when a voltage is applied to the shunt trip device. When the shunt trip is energized, the applied voltage drops across the three components proportionally according to their resistance. The circuit incorporates an AC or DC power supply 354 a PTC resistor, 351, in series with a coil 353 and clearing switch 355. Initially, the switch is closed and has near zero resistance. The coil dissipates most of the energy due to the low resistance of the cold PTC element 353 and the closed switch. When the breaker trips, it will open the shunt trip clearing switch causing the switch resistance to rise. In the absence of the PTC resistor, most of the voltage drop and power dissipation would be in the switch. This requires that the switch be rated to handle the power dissipation. In the present invention, the resistance of the PTC element rises sharply, reducing the circuit current. This reduces the required power rating of the switch.

Several embodiments of the invention have been described. It will be obvious to those skilled in the art that various changes and modifications may be made therein without departing from the intent of the invention, and the purpose of the claims is to cover all such changes and modifications as fall within the true spirit and scope of the invention.

We claim:

1. A circuit breaker for interrupting the flow of electrical current in a line comprising:
   (a) a first switch connected in series with the line, the switch having an open position and a closed position;
   (b) a device coupled to the first switch, adapted to be actuated by at least one activating signal, to move the first switch from the closed position to the open position;
   (c) a resistor having a positive temperature coefficient of resistivity connected in series with the first switch, said resistor being connected to said device to provide a first activating signal to the device; and
   (d) a voltage limiting device connected in parallel to said resistor;
   (e) a circuit adapted for sensing a ground fault current in the line and providing a second actuating signal to the device when the ground fault current is sensed; and
   wherein the first activating signal is provided to a first coil in the device and the second activating signal is provided to a second coil in the device, and wherein the first coil and the second coil are wound around a common core.

2. The circuit breaker of claim 1 wherein the device further comprises a reverse current loop, the reverse current loop being adapted, during a short circuit condition on the line, to produce a force that moves the first switch from the closed position to the open position.

3. The circuit breaker of claim 2 further comprising a permanent magnet, the permanent magnet being adapted to keep the first switch in the open position after it has moved from the closed position to the open position.

4. A circuit breaker for interrupting the flow of electrical current in a line comprising:
   (a) a first switch connected in series with the line, the first switch having an open position and a closed position;
   (b) a device coupled to the first switch, adapted to be actuated by at least one activating signal, to move the first switch from the closed position to the open position;
   (c) a resistor having a positive temperature coefficient of resistivity connected in series with the first switch, said resistor being connected to said device to provide a first activating signal to the device; and
   (d) a voltage limiting device connected in parallel to said resistor;
   (e) a second switch having an open position and a closed position and adapted for actuating the device;
   (f) a diode arrangement connected to the second switch and adapted to prevent a short circuit current from flowing through said resistor; and
   (g) a sensor adapted for sensing a ground fault current in the line and providing a second activating signal to the second switch when the ground fault current is sensed; and
   wherein the second switch is adapted to move from the open position to the closed position in response to said second activating signal wherein the device is actuated.

5. The circuit breaker of claim 4 wherein the second switch is a semiconductor-controlled rectifier.

6. A circuit breaker for interrupting the flow of electrical current in a line comprising:

(a) a first switch connected in series with the line, the first switch having an open position and a closed position;

(b) a device coupled to the first switch, adapted to be actuated by at least one activating signal, to move the first switch from the closed position to the open position;

(c) a resistor having a positive temperature coefficient of resistivity connected in series with the first switch, said resistor being connected to said device to provide a first activating signal to the device; and (d) a voltage limiting device connected in parallel to said resistor;

(e) a second switch, connected to the line and to a ground, the second switch having an open position and a closed position; and (f) a sensor adapted for sensing a ground fault current in the line and providing a ground fault signal to the second switch when a ground fault current is sensed; and wherein the second switch is adapted to move from the open position to the closed position in response to said ground fault signal.

7. A ground fault interruption module for use with a circuit breaker having a positive temperature coefficient of resistivity element comprising:

(a) a line having an electrical current, wherein the circuit breaker is connected to the line;

(b) a switching device, connected to the line and to a ground, the switching device having an open position and a closed position; and (c) a sensor adapted for sensing a ground fault current in the line and providing a ground fault signal to the switching device when the ground fault current is sensed;

wherein the switching device is adapted to move from the open position to the closed position in response to said ground fault signal causing the electrical current in the line to increase wherein the positive temperature coefficient of resistivity element increases in temperature providing for interruption of the electrical current in the line.

8. A method of interrupting the flow of electrical current in a line comprising:

(a) connecting a first switch having an open position and a closed position in series with the line;

(b) coupling a device adapted to be actuated by at least one activating signal to the first switch to move the first switch from the closed position to the open position;

(c) connecting a resistor having a positive temperature coefficient of resistivity in series with the first switch, said resistor being connected to said device to provide a first activating signal to the device;

(d) connecting a voltage limiting device in parallel to said resistor;

(e) connecting a second switch to the line and to a ground, the second switch having an open position and a closed position;

(f) connecting a circuit adapted for sensing a ground fault current in the line to the second switch;

(g) providing a ground fault signal from the circuit to the second switch when the ground fault current is sensed; and (h) moving the second switch from the open position to the closed position in response to the ground fault signal.

* * * * *